United States Patent Office 3,644,400
Patented Feb. 22, 1972

3,644,400
AZIRIDINO MITOSENES
Keizo Uzu, Kinichi Nakano, and Toshinaka Takahashi, Tokyo-to, Japan, assignors to Kyowa Hakko Kogyo Kabushiki Kaisha, Tokyo-to, Japan
Filed July 8, 1969, Ser. No. 839,921
Claims priority, application Japan, July 23, 1968, 43/51,644
Int. Cl. C07d 27/54
U.S. Cl. 260—326.3
9 Claims

ABSTRACT OF THE DISCLOSURE

A process for preparing compounds of the formula

Figure 1:
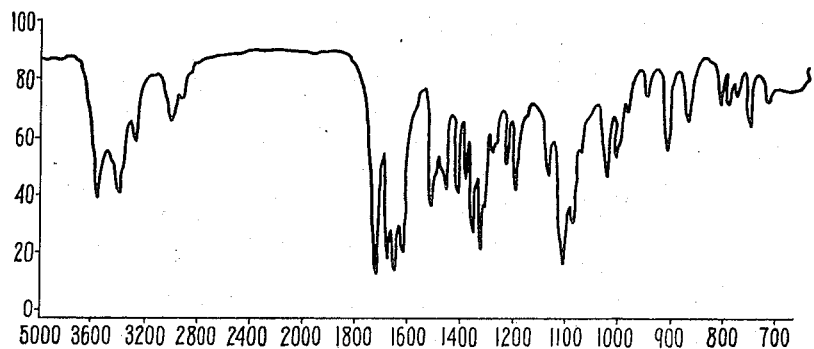

[Structure of compound with $CH_3O$, $CH_3$, $CH_2OCOR_3$, $N-CH_3$ substituents]

is provided wherein $R_3$ is $NH_2$ or lower alkyl. These compounds are antibiotics.

BACKGROUND OF THE INVENTION AND DESCRIPTION OF THE PRIOR ART

The mitomycin of the formula

[Structure (I) with $CH_3O$ at position 7, $CH_2OCONH_2$ at 9, OH at 9a, $CH_3$ at 6, $N-CH_3$, positions numbered 1-9a]

(I)

is a known antibiotic and, additionally, finds use in treating tumors. This mitomycin, however, is strongly toxic and has undesirable side effects. The mitomycin of Formula I will be referred to herein as mitromycin B.

Derivatives of the mitomycin of Formula I of the formula

[Structure (II) with $CH_3O$, $CH_2OR_1$, OH, $CH_3$, $N-CH_3$]

(II)

wherein $R_1$ is hydrogen or $R_2CO$ and $R_2$ is lower alkyl are described in our copending application Ser. No. 814,278, filed Apr. 8, 1969. The compound of Formula II wherein $R_1$ is hydrogen will be generically referred to herein as decarbamoyl mitomycin B. The compounds of Formula II wherein $R_1$ is $R_2CO$ and $R_2$ is lower alkyl will be generically referred to herein as acyl derivatives of decarbamoyl mitomycin B.

As disclosed in our copending application Ser. No. 814,278, decarbamoyl mitomycin B can be prepared by reacting the mitomycin of Formula I with an alkali metal alcoholate in an organic solvent. The alcoholate of a primary, secondary or tertiary alcohol may be employed as a nucleophilic reagent in an organic solvent (e.g., alcohol, tetrahydrofuran, dioxane, dimethylformamide, benzene). The reaction is preferably carried out at ambient temperature. Dry Ice in excess of the quantity necessary to neutralize the solution is added to the reaction mixture to neutralize excess alkali and the reaction mixture is then concentrated in vacuo. The residue obtained after concentration is combined with acetone to extract the reaction product. The extract is concentrated and then purified, for example, by using silica-gel chromatography to obtain crystalline decarbamoyl mitomycin.

As disclosed in our copending application Ser. No. 814,278, the acyl derivatives of decarbamoyl mitomycin B can be prepared by subjecting decarbamoyl mitomycin B to acylation to convert the $CH_2OH$ group at the 9-position into a $CH_2OCOR_2$ group wherein $R_2$ is lower alkyl. Acylation is conducted by dissolving decarbamoyl mitomycin B in a suitable solvent and adding an acid halide or acid anhydride or by condensing decarbamoyl mitomycin B with lower carboxylic acid in the presence of dehydrating condensing agent such as dichlohexylcarbodiimide. Excess organic base is added to the reaction mixture for the purpose of preventing decomposition of the reaction product by acid which may be formed during the acylation reaction.

A process for preparing the compound of the formula

[Structure (III) with $CH_3O$, $CH_3O$, $CH_2OCONH_2$, $N-CH_3$]

(III)

has been reported in the Journal of the American Chemical Society, 86. 1889 (1964). This compound will be generically referred to herein as aziridino mitosene. Aziridino mitosene is prepared according to this prior art process by starting with the mitomycin of Formula I. The reaction includes catalytically reducing the mitomycin of Formula I in the presence of palladium-carbon catalyst to adsorb one mole of hydrogen and produce the hydroquinol moiety which is then oxidized to form the hydroquinone moiety of the desired aziridino mitosene end product.

DESCRIPTION OF THE INVENTION

An object of the present invention is the provision of derivatives of aziridino mitosene of Formula III which are effective antibiotics. A further object of the present invention is the provision of a process for preparing aziridino mitosene of Formula III and derivatives thereof.

According to the present invention, compounds of the formula

[Structure (IV) with $CH_3O$, $CH_3$, $CH_2OCOR_3$, $N-CH_3$]

(IV)

are provided wherein $R_3$ is lower allkyl and a proces for the preparation of compounds of Formula IV is provided wherein $R_3$ is $NH_2$ or lower alkyl.

According to the first aspect of the invention, derivatives of aziridino mitosene of Formula IV are provided wherein $R_3$ is lower alkyl.

According to the second aspect of the invention, a process for preparing aziridino mitosene of Formula IV and derivatives thereof is provided wherein the mitomycin of Formula I or decarbamoyl mitomycin B or acyl derivatives thereof of Formula II is reacted with acid anhydride in the presence of alkali metal hydride. The advantages of the process according to the second aspect of the invention lies in the fact that this process can be carried out with good yield and can be applied not only to the mitomycin of Formula I but also to decarbamoyl mitomycin B and acyl derivatives thereof of Formula II. In this respect the present process is far superior to the catalytic reducing process of the prior art.

Describing the second aspect of the invention in detail, the mitomycin of Formula I or decarbamoyl mitomycin B or acyl derivatives thereof of Formula II is dissolved in a solvent which does not contain activated hydrogen atoms (e.g., benzene, tetrahydrofuran, dioxane, dimethylformamide), combined with an excess amount of alkali metal hydride and subsequently combined with an acid anhydride (e.g., a carboxylic acid anhydride such as lower alkanoic acid anhydride). The bluish purple solution normally gradually turns to reddish orange but sometimes orange precipitates are formed. A color-change to reddish orange implies the completion of the reaction. When precipitates are formed, they are crystallized. When crystallization does not occur, the solvent is removed by evaporation in vacuo and the residue is purified by silica-gel column chromatography.

The minimum concentration in γ/ml. of solution necessary to inhibit the growth of four representative types of pathogenic bacteria is shown in Table 1 for aziridino mitosene and its related compounds. When the $CONH_2$ group is replaced by hydrogen, the resulting compound shows almost no biological activity; however, when the $CONH_2$ group is converted into the $COCH_3$ group, the resulting compound shows almost the same activity.

TABLE 1

| Bacteria | $R_3=CONH_2$ | H | $COCH_3$ |
|---|---|---|---|
| Bacillus subtilis (ATCC 6633) | 0.76 | 12.5 | 0.195 |
| Staphylococcus aureus (ATCC 21027) | 0.76 | >12.5 | 0.39 |
| Escherichia coli (ATCC 14948) | 3.0 | >12.5 | 6.25 |
| Pseudomonas aeruginosa (ATCC 15246) | 25 | >12.5 | 25 |

The following non-limitative examples illustrate the invention:

EXAMPLE 1

One hundred (100) milligrams of the mitomycin of Formula I were dissolved in 20 ml. of absolute tetrahydrofuran and combined with 25 mg. of sodium hydride and subsequently with 28 mg. of acetic anhydride with stirring, then, subjected to reaction. After one hour, orange-colored precipitate was formed. The precipitate was dissolved in a small amount of dimethylformamide and was allowed to stand in a cold room to crystallize. The physical and chemical properties of the crystals were identical with those described in the literature and were, accordingly, identified as the compound of Formula IV wherein $R_3$ is $NH_2$ (1a-methyl aziridino mitosene B). The infrared spectrum of this compound is shown in FIG. 1.

EXAMPLE 2

Figure 2:
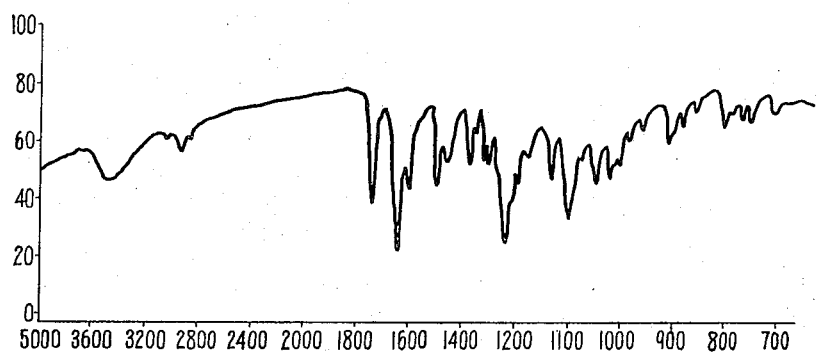

Two hundred (200) milligrams of the compound of Formula II wherein $R_1$ is hydrogen were dissolved in 20 ml. of absolute tetrahydrofuran, combined with 200 mg. of sodium hydride and 0.2 ml. of acetic anhydride and stirred at room temperature. The reaction solution gradually turned from purple to reddish orange. The reaction was complete after about 8 hours. The reaction mixture was combined with water-containing ethyl acetate to decompose the excess sodium hydride and addition product. The insoluble material was filtered off and the filtrate was concentrated in vacuo and purified by silica-gel chromatography. The main fraction was crystallized from acetone-petroleum ether to give 40 mg. of reddish-orange needle crystals. Melting point: 188–189° C. (decomposed). The infra-red spectrum of the crystals which were identified as the compound of Formula IV wherein $R_3$ is methyl (acetate of 1a-methyl decarbamoyl aziridino mitosene) is shown in FIG. 2.

EXAMPLE 3

The reaction of Example 1 was repeated using 200 mg. of the compound of Formula II wherein $R_1$ is $R_2CO$ and $R_2$ is methyl (acetyl decarbamoyl mitomycin B). The infra-red spectrum and melting point of the resulting crystals were identical with those of the product of Example 2.

We claim:
1. A compound of the formula

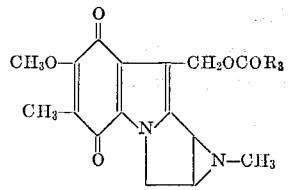

wherein $R_3$ is lower alkyl.

2. The compound of claim 1 wherein $R_3$ is methyl.

3. A process for preparing the compound of the formula

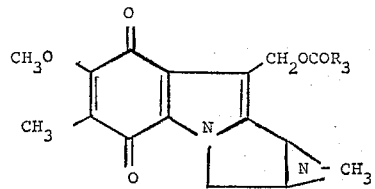

wherein $R_3$ is $NH_2$ or lower alkyl wherein a compound of the formula

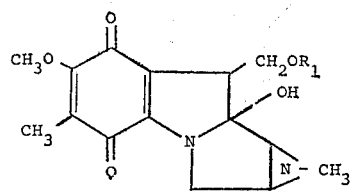

wherein $R_1$ is hydrogen, $CONH_2$ or $R_2CO$ and $R_2$ is lower alkyl is reacted with a lower alkanoic acid anhydride in the presence of an alkali metal hydride.

4. The process of claim 3 wherein the acid anhydride is acetic anhydride.

5. The process of claim 3 wherein the alkali metal hydride is sodium hydride.

6. The process of claim 3 wherein $R_1$ is $CONH_2$, the acid anhydride is acetic anhydride and the alkali metal hydride is sodium hydride.

7. The process of claim 3 wherein $R_1$ is hydrogen, the acid anhydride is acetic anhydride and the alkali metal hydride is sodium hydride.

8. The process of claim 3 wherein $R_1$ is $R_2CO$, $R_2$ is methyl, the acid anhydride is acetic anhydride and the alkali metal hydride is sodium hydride.

9. The process of claim 3 wherein the reaction is conducted in a solvent selected from the group consisting of benzene, tetrahydrofuran, dioxane and dimethylformamide.

References Cited

UNITED STATES PATENTS 3,429,894   2/1969   Matsui et al. _____ 260—326.3

ALEX MAZEL, Primary Examiner

J. A. NARCAVAGE, Assistant Examiner

U.S. Cl. X.R.

260—326.5 B, 999